(12) United States Patent
Kondo

(10) Patent No.: US 12,465,728 B2
(45) Date of Patent: Nov. 11, 2025

(54) GUIDE WIRE

(71) Applicant: TERUMO KABUSHIKI KAISHA, Tokyo (JP)

(72) Inventor: Shinji Kondo, Ebina (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 1030 days.

(21) Appl. No.: 17/466,477

(22) Filed: Sep. 3, 2021

(65) Prior Publication Data

US 2021/0393927 A1 Dec. 23, 2021

Related U.S. Application Data

(63) Continuation of application No. PCT/JP2020/005538, filed on Feb. 13, 2020.

(30) Foreign Application Priority Data

Mar. 4, 2019 (JP) ................................ 2019-038773

(51) Int. Cl.
*A61M 25/09* (2006.01)
(52) U.S. Cl.
CPC ... *A61M 25/09* (2013.01); *A61M 2025/09058* (2013.01); *A61M 2025/09183* (2013.01); *A61M 2025/09191* (2013.01)
(58) Field of Classification Search
CPC ............................. A61B 5/14551; A61B 5/413
See application file for complete search history.

(56) References Cited

U.S. PATENT DOCUMENTS 8,992,556 B2   3/2015 Chanduszko et al.
2005/0090763 A1*  4/2005 Wang ..................... A61B 10/04
                                                          600/564

(Continued)

FOREIGN PATENT DOCUMENTS

JP   2013503693 A    2/2013
WO   2018181520 A1  10/2018

OTHER PUBLICATIONS

English Translations of the International Search Report (Form PCT/ISA/210) and the Written Opinion of the International Searching Authority (Form PCT/ISA/237) issued Apr. 14, 2020, by the Japanese Patent Office in corresponding International Application No. PCT/JP2020/005538. (9 pages).

(Continued)

*Primary Examiner* — Rene T Towa
(74) *Attorney, Agent, or Firm* — Buchanan Ingersoll & Rooney PC

(57) ABSTRACT

A guide wire is disclosed for guiding a tubular elongated body to be inserted into a living body can include: an elongated shaft portion that has flexibility; a puncture portion that is disposed at a distal end portion of the shaft portion and forms a hole in a biological tissue; and a cover portion that is formed of a wire member wound in a spiral shape, has a contraction portion that is contractible, and covers the puncture portion. The contraction portion is capable of causing the puncture portion to protrude from the cover portion by contracting the contraction portion in a linear state. When the contraction portion is in a curved state, the contraction portion is restricted in contraction so that the puncture portion does not protrude from the cover portion by contact of adjacent wire members on a concave side.

20 Claims, 6 Drawing Sheets

(56) References Cited

U.S. PATENT DOCUMENTS

| | | | |
|---|---|---|---|
| 2006/0025720 A1* | 2/2006 | Sawa | A61M 25/0084 604/164.01 |
| 2007/0219464 A1* | 9/2007 | Davis | A61M 25/09 600/585 |
| 2009/0198153 A1 | 8/2009 | Shriver | |
| 2011/0054487 A1 | 3/2011 | Farnan | |
| 2014/0371676 A1* | 12/2014 | Leeflang | A61B 17/3423 604/164.1 |
| 2020/0023168 A1 | 1/2020 | Hayakawa et al. | |

OTHER PUBLICATIONS

International Search Report (PCT/ISA/210) with translation and Written Opinion (PCT/ISA/237) mailed on Apr. 14, 2020, by the Japanese Patent Office as the International Searching Authority for International Application No. PCT/JP2020/005538.

* cited by examiner

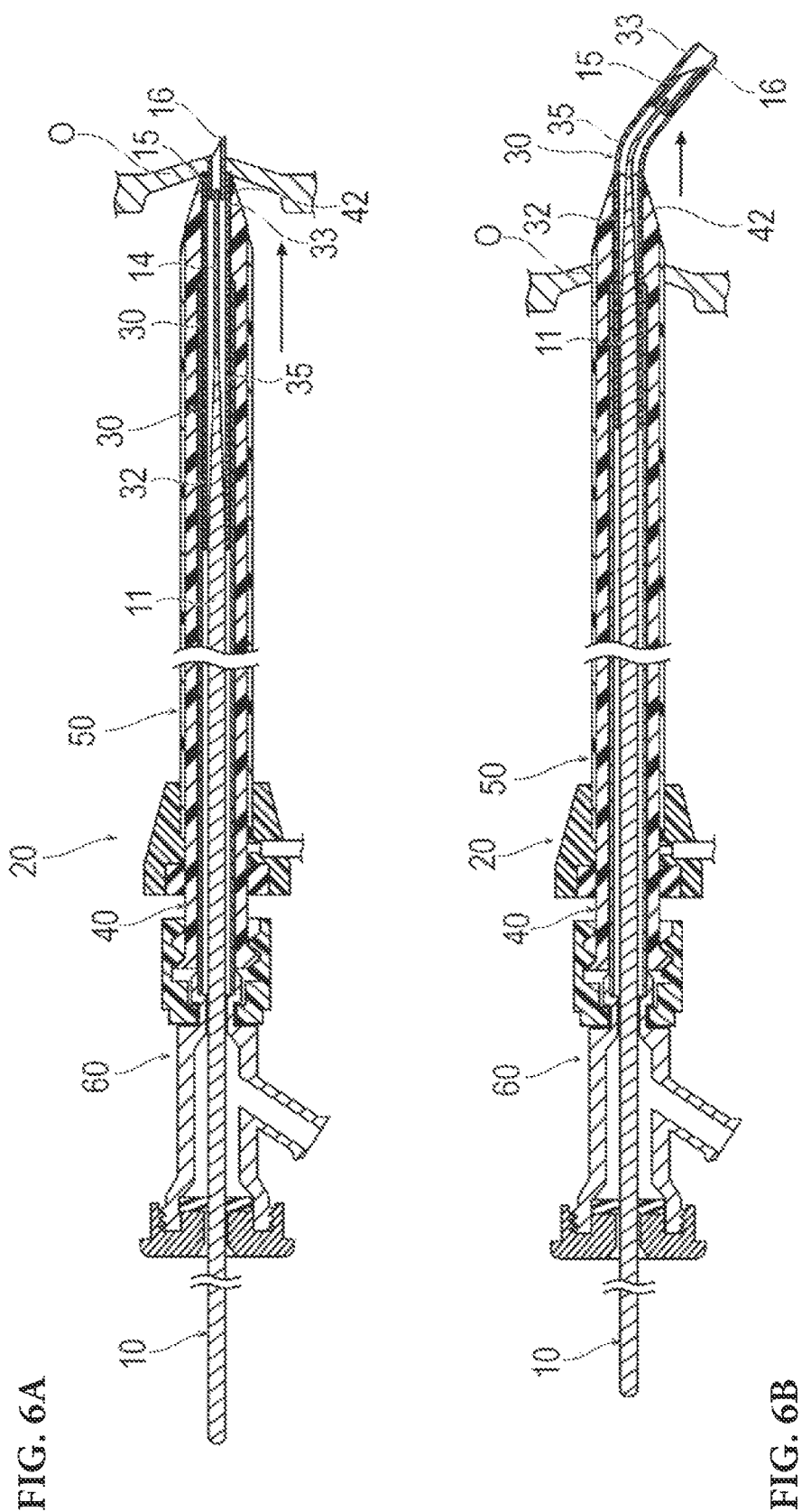

GUIDE WIRE

This application is a continuation of International Application No. PCT/JP2020/005538 filed on Feb. 13, 2020, which claims priority to Japanese Patent Application No. 2019-038773 filed on Mar. 4, 2019, the entire content of both of which is incorporated herein by reference.

FIELD OF THE DISCLOSURE

This disclosure generally relates to a guide wire for puncturing a biological tissue.

BACKGROUND DISCUSSION

A heart repeatedly contracts and expands at an appropriate timing by current flowing through a myocardial tissue called a stimulation conduction system, and circulates blood. When generation or transmission of an electric signal flowing through the stimulation conduction system is not normal, contraction or expansion cannot be performed at the appropriate timing, and arrhythmia occurs.

As a method of treating arrhythmia, a method is known in which a conduction path of a signal that causes the arrhythmia is ablated and blocked by heating or cooling. As a device for performing the treatment method, there is known a device that can be percutaneously inserted to a left atrium and ablate a conduction path of a signal located at a pulmonary vein opening. Such an ablation device is widely used since the device is minimally invasive and highly effective.

Ablation is performed in the left atrium, requires a technique called an interatrial septum puncture (Brockenbrough method) in which a needle is inserted into a thin partition wall called a foramen ovalis of an interatrial septum from a right atrium to make a hole leading from the right atrium to the left atrium. A transseptal needle, which is a device for performing the interatrial septum puncture, includes a mechanical needle and a radio frequency needle. The mechanical needle becomes the mainstream due to low cost.

The mechanical needle performs puncture using a sharp needle. When the mechanical needle is used, a risk of erroneous puncture occurs due to excessive pressing of the needle. If the needle is erroneously punctured, serious complications called cardiac tamponade (a state in which blood accumulates between the pericardium and the cardiac muscle, which causes heart failure) may occur. On the other hand, the radio frequency needle is a method of passing through the interatrial septum by outputting high frequency energy supplied from a console which is a separately provided device. Therefore, the radio frequency needle does not have a risk of erroneous puncture, but is expensive and requires a console.

For example, U.S. Pat. No. 8,992,556 discloses a device in which an inner needle, which is the mechanical needle, is disposed inside a tubular outer needle. A distal end of the inner needle is bent so as to face a proximal end side. The distal end of the inner needle is accommodated in the outer needle in a linearly stretched state. The inner needle protrudes from the outer needle to form a hole in the interatrial septum from the right atrium side. After reaching the left atrium, the inner needle bends and faces the proximal end side. In view of this, the device disclosed in U.S. Pat. No. 8,992,556 prevents the occurrence of the erroneous puncture due to the inner needle.

The inner needle of the device disclosed in U.S. Pat. No. 8,992,556 is bent and faces the proximal end side after puncturing, but is not accommodated in another member. Therefore, in this device, the risk of erroneous puncture due to the inner needle remains. The inner needle is always exposed in the outer needle. Therefore, in a process of inserting the inner needle into the outer needle and transporting the inner needle to the interatrial septum, an inner side may damage the outer needle or a distal end portion of the inner needle may be damaged. A device that punctures a biological tissue is required to have relatively high safety.

SUMMARY

A guide wire is disclosed that can help prevent erroneous puncture by a puncture portion that performs puncture and can obtain relatively high safety.

A guide wire is disclosed for guiding a tubular elongated body to be inserted into a living body. The guide wire includes: a flexible elongated shaft portion that includes a distal end portion; a puncture portion configured to form a hole in a biological tissue, the puncture portion being at the distal end portion of the shaft portion; and a cover portion that is formed of a wire member wound in a spiral shape, the cover portion including a contraction portion that is contractible and covers the puncture portion. The contraction portion is capable of causing the puncture portion to protrude from the cover portion by contracting the contraction portion in a linear state. When the contraction portion is in a curved state, the contraction portion is restricted in contraction so that the puncture portion does not protrude from the cover portion by contact of adjacent wire members on a concave side.

According to another aspect of this disclosure, a guide wire is disclosed for guiding a tubular elongated body to be inserted into a living body. The guide wire includes: a flexible elongated shaft portion that includes a distal end portion; a puncture portion configured to form a hole in a biological tissue, the puncture portion being disposed at the distal end portion of the shaft portion; and a cover portion that is formed of a wire member wound in a spiral shape, the cover portion has a contraction portion that is contractible and covers the puncture portion. The cover portion includes at least one first projection portion at the contraction portion or a part of a portion different from the contraction portion in a circumferential direction. The contraction portion or the puncture portion includes a second projection portion at a part in the circumferential direction, the second projection portion facing the first projection portion along a central axis of the cover portion so as to be capable of coming into contact with the first projection portion in a natural state.

In the guide wires as described above, even when a force acts on the cover portion from the distal end side in the curved state of the cover portion, the wire members on the concave side of the contraction portion come into contact with each other, and the puncture portion does not protrude from the cover portion. Therefore, the guide wires according to this disclosure can help prevent erroneous puncture by the puncture portion, and can obtain relatively high safety.

In another aspect of the guide wires as described above, even when the force acts on the cover portion from the distal end side in the natural state, the first projection portion and the second projection portion come into contact with each other, and contraction of the contraction portion is prevented. Therefore, the puncture portion does not protrude from the cover portion. Therefore, the guide wire according to this disclosure can help prevent erroneous puncture by the puncture portion, and can obtain relatively high safety.

In a further aspect, a guide wire in combination with a sheath assembly is disclosed, the guide wire being configured to guide a part of the sheath assembly that is configured to be inserted into a living body comprising: the guide wire comprising: a flexible elongated shaft portion that includes a distal end portion; a puncture portion configured to form a hole in a biological tissue, the puncture portion being at the distal end portion of the shaft portion; a cover portion that is formed of a wire member wound in a spiral shape, the cover portion includes a contraction portion that is contractible and covers the puncture portion; the contraction portion being configured such that the puncture portion protrudes from the cover portion by contraction of the contraction portion in a linear state; when the contraction portion is in a curved state, the contraction portion is restricted in contraction so that the puncture portion does not protrude from the cover portion by contact of adjacent wire members on a concave side of the contraction portion; wherein, when the contraction portion is in the linear state, a gap distance between the wire members of the contraction portion is longer than a gap distance between the wire members at a portion of the cover portion different from the contraction portion; and the sheath assembly comprising a dilator, the dilator including a distal end and a tapered outer surface that tapers toward the distal end of the dilator so that an outer diameter of the dilator becomes smaller toward the distal end of the dilator, the dilator including a lumen that communicates with an open end at the distal end of the dilator, the guide wire being positionable in the lumen in the dilator.

BRIEF DESCRIPTION OF THE DRAWINGS

FIG. 3A shows a state in which a curve portion is extended linearly. FIG. 3B shows a state in which a cover portion is contracted.

FIGS. 6A and 6B are cross-sectional views showing a state when puncture is performed with the guide wire. FIG. 6A shows a state in which a puncture portion protrudes from the cover portion and punctures a foramen ovalis. FIG. 6B shows a state in which the puncture portion is accommodated in the cover portion.

FIG. 7A shows a state before a curve portion is contracted. FIG. 7B shows a state in which a cover portion is contracted.

FIG. 10A is a cross-sectional view taken along a line XA-XA in FIG. 9. FIG. 10B is a cross-sectional view showing a state in which a puncture portion is rotated about 90 degrees with respect to a cover portion.

DETAILED DESCRIPTION

Figure 1:
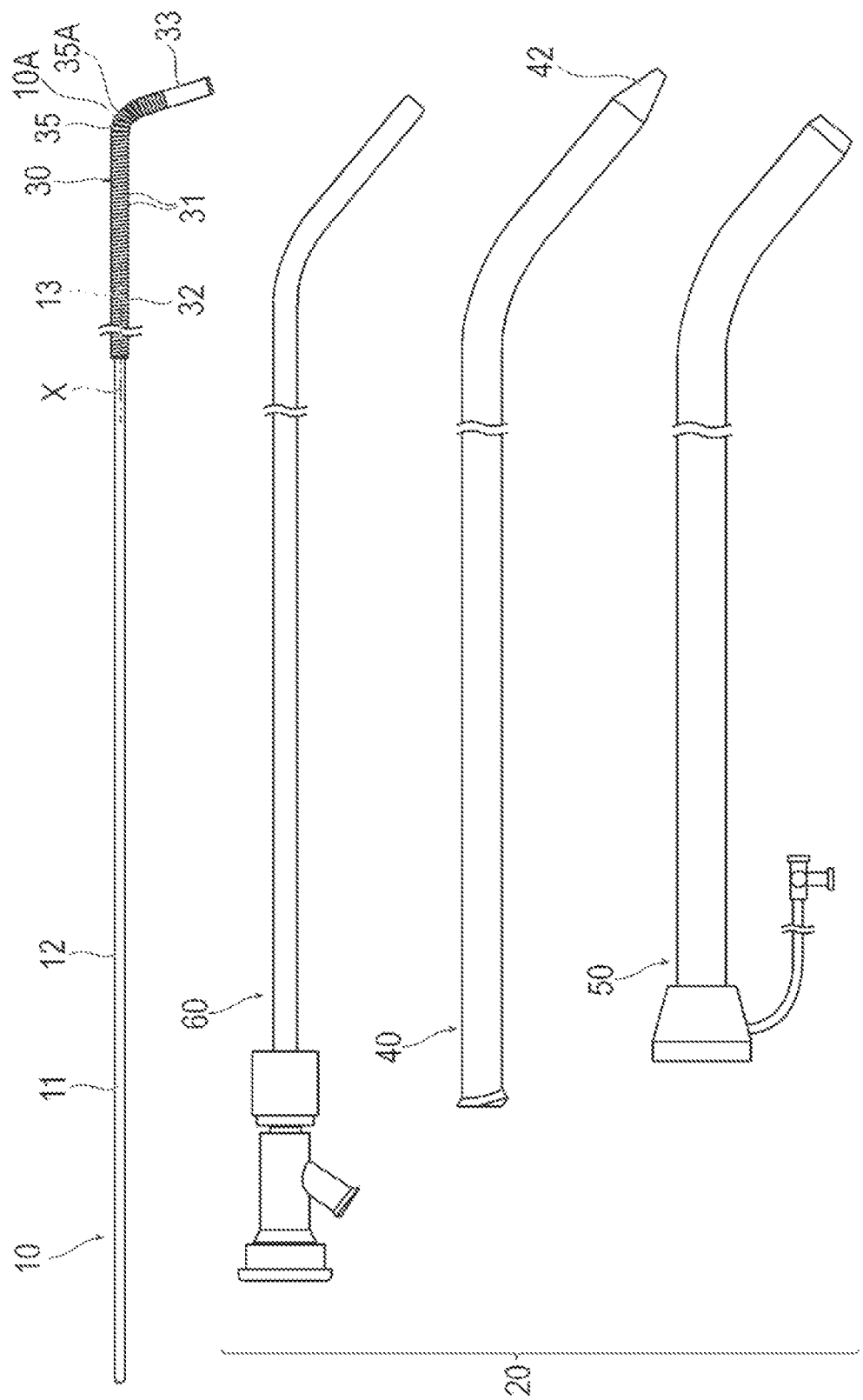
FIG. 1 is a plan view showing a guide wire and a sheath assembly according to a first embodiment.

Set forth below with reference to the accompanying drawings is a detailed description of embodiments of a guide wire representing examples of the inventive guide wire disclosed here. For convenience of explanation, dimensions in the drawings may be exaggerated and may be different from actual dimensions. Further, in the present specification and the drawings, structural elements that have the same or substantially the same function are denoted with the same reference numerals, and a detailed explanation of these features will not be repeated. In the present specification, a side to be inserted into a lumen is referred to as a "distal end side", and a hand-side to be operated by a user or operator is referred to as a "proximal end side".

First Embodiment

A guide wire 10 according to a first embodiment of this disclosure has a puncture function, and is used to form a hole leading from a right atrium to a left atrium in a foramen ovalis O. The hole may be a cut. When the foramen ovalis O has the hole, an ablation catheter percutaneously inserted into a vena cava can be guided to the right atrium and then inserted into the left atrium through the hole to ablate the periphery of the pulmonary vein opening. That is, the guide wire 10 is used to form an access route for the ablation catheter in the foramen ovalis.

As shown in FIG. 1, the guide wire 10 is used together with a sheath assembly 20 into which the guide wire 10 can be inserted. The sheath assembly 20 includes an inserter 60 into which the guide wire 10 is inserted, a dilator 40 into which the inserter 60 is inserted, and an outer sheath 50 into which the dilator 40 is inserted.

Figure 2:
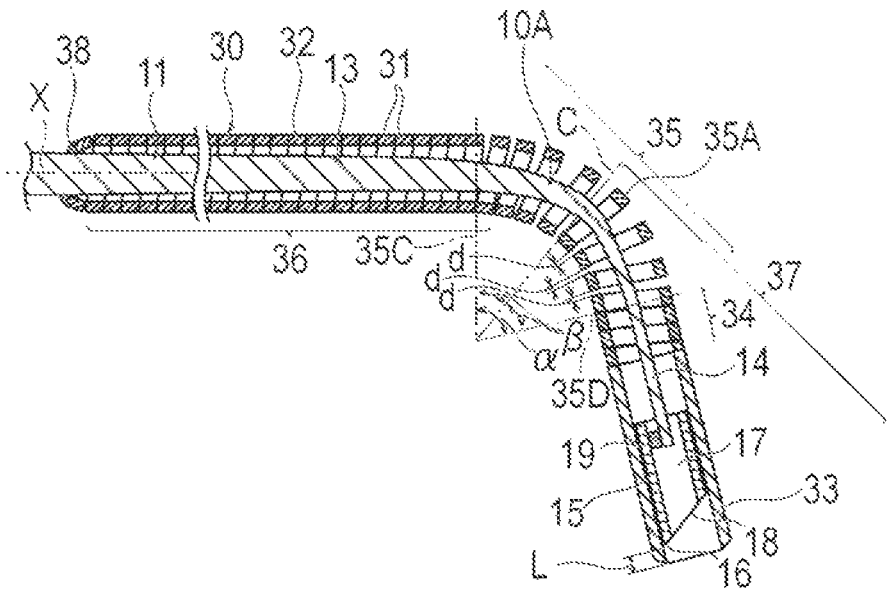
FIG. 2 is a cross-sectional view showing a distal end portion of the guide wire according to the first embodiment.

The guide wire 10 is an elongated device that guides the sheath assembly 20 including the dilator 40 and the ablation catheter to a target position in a blood vessel. The guide wire 10 also has a function of puncturing the foramen ovalis O. As shown in FIGS. 1 and 2, the guide wire 10 includes a shaft portion 11 that is an elongated wire member, a puncture portion 15 including a sharp needle portion 16, and a cover portion 30 that accommodates the puncture portion 15.

The guide wire 10 has a wire curve portion 10A whose axial center is bent at a portion where the cover portion 30 covers the shaft portion 11. The wire curve portion 10A is bent by fixing the unbent cover portion 30 to the bent shaft portion 11. Alternatively, the wire curve portion 10A may be bent by fixing the bent cover portion 30 to the unbent shaft portion 11. Alternatively, the wire curve portion 10A may be bent by fixing the bent cover portion 30 to the bent shaft portion 11.

The shaft portion 11 includes a shaft proximal end portion 12 located on a proximal end side, a shaft distal end portion 14 located on a distal end side, and a shaft decreased diameter portion 13 located between the shaft proximal end portion 12 and the shaft distal end portion 14. The shaft proximal end portion 12 is a portion located on the proximal end side and having a constant outer diameter. The shaft decreased diameter portion 13 is a portion that extends from the shaft proximal end portion 12 toward the distal end side and has an outer diameter reduced in a tapered shape. The outer diameter of the shaft decreased diameter portion 13 is reduced in the tapered shape, so that physical properties such as flexural rigidity are gradually changed along the axial direction. Therefore, the shaft decreased diameter portion 13 can help prevent the occurrence of a kink or the like due to a rapid change in the physical properties of the shaft portion 11 of the guide wire 10. The flexural rigidity of the shaft decreased diameter portion 13 is gradually reduced along the axial direction. Therefore, the shaft portion 11 has high pushing performance and accessibility in a bent blood vessel. The shaft distal end portion 14 is a portion extending from the shaft decreased diameter portion 13 toward the distal end side and having a constant outer diameter. The outer diameter of the shaft distal end portion 14 is smaller than the outer diameter of the shaft proximal end portion 12. The outer diameter of the shaft distal end portion 14 may not be constant.

The material of the shaft portion 11 preferably has flexibility and is hard to some extent. For example, the material of the shaft portion 11 can include metals such as stainless steel, tantalum, titanium, platinum, gold, and tungsten, shape memory alloys to which shape memory effects and superelasticity are imparted by heat treatment, polyolefins such as polyethylene and polypropylene, polyesters such as polyamide and polyethylene terephthalate, fluorine-based polymers such as PTFE (polytetrafluoroethylene) and ETFE (ethylene-tetrafluoroethylene copolymer), PEEK (polyether ether ketone), and polyimide can be suitably used. The shape memory alloy can include a Ni—Ti based alloy, a Cu—Al—Ni based alloy, a Cu—Zn—Al based alloy, or the like. The shaft portion 11 may include an X-ray contrast material. The X-ray contrast material is preferably formed of, for example, at least one metal or two or more alloys selected from a group formed of gold, platinum, iridium, tungsten, gold alloys, platinum alloys, iridium alloys, tungsten alloys, and silver-palladium alloys.

A length of the shaft portion 11 in the axial direction can be, for example, 300 mm to 5000 mm, preferably 1000 mm to 3000 mm, and more preferably 1500 mm to 2500 mm. The outer diameter of the shaft distal end portion 14 can be, for example, 0.04 mm to 0.8 mm, preferably 0.08 mm to 0.4 mm, and more preferably 0.12 mm to 0.35 mm. The outer diameter of the shaft proximal end portion 12 can be, for example, 0.3 mm to 1.0 mm, preferably 0.4 mm to 0.8 mm, and more preferably 0.7 mm to 0.8 mm.

The puncture portion 15 is a circular tube having the sharp needle portion 16 configured to pierce the biological tissue. The puncture portion 15 includes a through hole 17 penetrating from the proximal end side to the distal end side. The puncture portion 15 is fixed to the distal end portion of the shaft portion 11. The puncture portion 15 has an inclined surface 18 inclined with respect to a central axis at the distal end. The sharp needle portion 16 for puncturing the biological tissue is formed at the distal end of the inclined surface 18. The distal end of the shaft distal end portion 14 is disposed inside the puncture portion 15. The distal end of the shaft distal end portion 14 is fixed to an inner peripheral surface of the puncture portion 15 by a needle fixing portion 19 by welding, adhesion, or the like. The inner diameter of the puncture portion 15 is larger than the outer diameter of the shaft distal end portion 14. It is preferable that the axial center of the puncture portion 15 and the axial center of the shaft distal end portion 14 substantially coincide with each other. Alternatively, the axial center of the puncture portion 15 and the axial center of the shaft distal end portion 14 may not coincide with each other. A shape of the needle portion 16 is not particularly limited as long as the needle portion 16 can puncture biological tissue, and the shape of the needle portion 16 may be, for example, a conical shape, a knife-type flat plate, or a shovel-like curved plate. Therefore, the through hole 17 may not be formed in the puncture portion 15. A cross-sectional shape of the puncture portion 15 may not be circular. The puncture portion may have a structure integrated with the shaft portion. The puncture portion 15 may be an electrode or the like capable of emitting energy such as current or heat.

A length of the puncture portion 15 in the axial direction is preferably set such that the flexibility of the guide wire 10 in the blood vessel is not impaired. The length of the puncture portion 15 in the axial direction can be, for example, 2 mm to 10 mm, preferably 2 mm to 6 mm, and more preferably 2 mm to 4 mm. The outer diameter of the puncture portion 15 can be, for example, 0.3 mm to 1.0 mm, preferably 0.4 mm to 0.8 mm, and more preferably 0.5 mm to 0.6 mm. The inner diameter of the puncture portion 15 can be, for example, 0.1 mm to 0.9 mm, preferably 0.2 mm to 0.7 mm, and more preferably 0.3 mm to 0.5 mm. An inclination angle of the inclined surface 18 of the puncture portion 15 with respect to the central axis is appropriately set, and can be, for example, 3 degrees to 45 degrees, preferably 5 degrees to 40 degrees, and more preferably 10 degrees to 35 degrees.

The material for the puncture portion 15 is preferably hard to some extent. For example, the material for the puncture portion 15 can include metals such as stainless steel, tantalum, titanium, platinum, gold, and tungsten, polyolefins such as polyethylene and polypropylene, polyesters such as polyamide and polyethylene terephthalate, fluorine-based polymers such as PTFE (polytetrafluoroethylene) and ETFE (ethylene-tetrafluoroethylene copolymer), PEEK (polyether ether ketone), and polyimide.

The cover portion 30 accommodates the puncture portion 15 in an exposable manner (i.e., the cover portion 30 accommodates the puncture portion 15 in a way allowing the puncture portion 15 to be exposed), and has a tubular shape as a whole. The cover portion 30 has an elastically deformable portion. Deformation includes both that the cover portion 30 can be contracted along a central axis X of the cover portion 30 and that the cover portion 30 can be moved between a state in which the central axis X of the cover portion 30 is bent and a state in which the central axis X of the cover portion 30 is linear. The cover portion 30 includes a coil portion 32 formed of a wire member 31 that draws a spiral line (i.e., the wire member 31 that defines spiral windings), and an accommodation tube 33 that is fixed to a distal end side of the wire member 31.

The accommodation tube 33 is a circular tube that slidably accommodates the puncture portion 15. A distal end surface of the accommodation tube 33 is curved (rounded) and smoothly formed. The accommodation tube 33 may be formed of the wire member 31 that draws the spiral line. Although the wire member 31 forming the accommodation tube 33 preferably traces a spiral configuration without gaps between axially adjacent windings, gaps between axially adjacent windings may exist.

The material for the accommodation tube 33 is preferably hard to some extent. For example, the material for the accommodation tube 33 can be metals such as stainless steel, tantalum, titanium, platinum, gold, and tungsten, polyolefins such as polyethylene and polypropylene, polyesters such as polyamide and polyethylene terephthalate, fluorine-based polymers such as PTFE (polytetrafluoroethylene) and ETFE (ethylene-tetrafluoroethylene copolymer), PEEK (polyether ether ketone), and polyimide.

The coil portion 32 is formed of one continuous wire member 31. Alternatively, the coil portion 32 may be formed of a plurality of wire members. The coil portion 32 has a substantially constant outer diameter and a substantially constant inner diameter along the central axis X of the spiral. The coil portion 32 includes a distal end dense pitch portion 34 located on the distal end side, a contraction portion 35 located on the proximal end side with respect to the distal end dense pitch portion 34, and a proximal end dense pitch portion 36 located on the proximal end side with respect to the contraction portion 35. In the distal end dense pitch portion 34 and the proximal end dense pitch portion 36, a pitch distance of the spiral is shorter than that of the contraction portion 35. Therefore, the distal end dense pitch portion 34 and the proximal end dense pitch portion 36 hardly contract along the central axis X of the spiral. The pitch distance is a movement distance in the axial direction when the spiral is wound 360 degrees in a circumferential direction. In the distal end dense pitch portion 34 and the proximal end dense pitch portion 36, the axially adjacent spiral windings of wire member 31 may be in contact with each other without a gap, or may be separated from each other so that an axially gap or space exist between axially adjacent windings of the wire member.

Figure 3A:
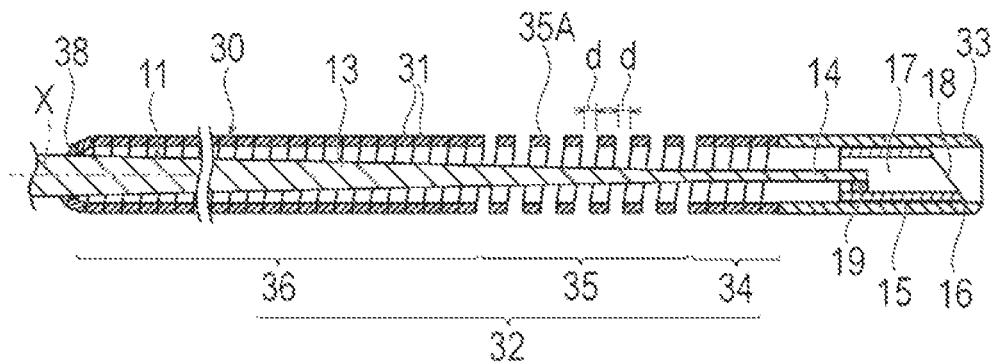
FIGS. 3A and 3B are cross-sectional views showing the distal end portion of the guide wire according to the first embodiment.

As shown in FIG. 3A, the coil portion 32 has the contraction portion 35 which has a relatively large gap distance d between the wire members 31 in a linear state and is contractible (i.e., shortens) along the central axis X. The gap distance d is a distance between the surfaces of the wire members 31 along the central axis X of the spiral, and the pitch distance is a distance between the central axes of the wire members 31 along the central axis X of the spiral, and therefore the gap distance d is shorter than the pitch distance. As shown in FIGS. 1 and 2, the contraction portion 35 is disposed at a position overlying or axially overlapping the wire curve portion 10A of the guide wire 10, thereby forming a curve portion 35A that is movable between a state in which the central axis X is bent and a state in which the central axis X is linear.

The wire curve portion 10A is bent at a total bending angle α in the natural state. The wire curve portion 10A has a curve center position C sandwiched by an angle β which is a half of the total bending angle α. In the curve portion 35A of the contraction portion 35 that is bent so as to overlap the wire curve portion 10A, the gap distance d between the wire members 31 is arranged along the central axis X on a concave side due to the curve portion 35A being curved. A portion of the cover portion 30 on the distal end side with respect to the curve center position C is defined as a cover distal end portion 37. A total gap length (3×d in the example in FIG. 2), which is the sum of the gap distances d located at the cover distal end portion 37, is shorter than a separation distance L in a direction along the central axis X between the distal end of the cover portion 30 and the distal end of the puncture portion 15. Accordingly, even if the cover portion 30 contracts so that the gap distance d located at the cover distal end portion 37 disappears, the puncture portion 15 does not protrude from the cover portion 30.

When the wire curve portion 10A is linearly deformed, the curve portion 35A is also linearly deformed as shown in FIG. 3A. Accordingly, the gap distance d between the wire members 31 located on the concave side of the curve portion 35A increases. Accordingly, the contraction portion 35 having the curve portion 35A is contractible along the central axis X.

The proximal end of the cover portion 30 can be fixed to the shaft portion 11 by a joint portion 38, for example, made of solder, an adhesive, a material melted by welding, or the like. The joint portion 38 fills a step and a gap between the proximal end of the cover portion 30 and the shaft portion 11. The central axis X of the spiral of the coil portion 32 substantially coincides with the axial centers of the shaft proximal end portion 12, the shaft decreased diameter portion 13, and the shaft distal end portion 14. The central axis X of the spiral in the contraction portion 35 may or may not coincide with the axial center of the shaft portion 11. The shaft portion 11 may or may not come into contact with the inner peripheral surface of the contraction portion 35.

The total bending angle α of the wire curve portion 10A is not particularly limited as long as it exceeds 0 degree, and is preferably 10 degrees to 180 degrees, and more preferably 70 degrees to 85 degrees. By providing the wire curve portion 10A, when the guide wire 10 is pushed forward in a living body, the distal end of the guide wire 10 is less likely to abut on the biological tissue, and damage to the biological tissue can be prevented. When the total bending angle α exceeds 90 degrees, the cover portion 30 can reliably prevent the puncture of the septum on the left atrium side by the puncture portion 15. When the total bending angle α is 70 to 85 degrees, the puncture portion 15 that punctures the foramen ovalis O is not directed to the septum on the left atrium side, and thus the puncture of the septum on the left atrium side can be prevented, and the puncture portion is likely to be linear.

The wire curve portion 10A is bent in a natural state in which an external force from gravity, a blood flow, or the like does not act. That is, the wire curve portion 10A is bent in the absence of any force applied to or acting on the wire curve portion 10A. The wire curve portion 10A may not be bent in the natural state when the wire curve portion 10A is bent in a use environment. For example, the wire curve portion 10A may be bent by an action of its own weight, or may be bent by receiving a force from a flow of blood. Since the guide wire 10 is flexible, even if the guide wire 10 is not bent in the natural state, the wire curve portion 10A can be formed in its bent shape by its own weight, the action of an external force from the blood flow, or the like.

The cross-sectional shape of the wire member 31 forming the cover portion 30, which is orthogonal to an extending direction of the wire member 31, can be circular. Accordingly, a spring constant of the contraction portion 35 can be reduced. Therefore, the contraction portion 35 can be rather easily deformed at the time of puncturing, and puncture resistance can be reduced. The cross-sectional shape of the wire member 31 forming the cover portion 30 may not be circular, and may be, for example, elliptical, rectangular, square, parallelogram, or trapezoidal. If the cross-sectional shape of the wire member 31 is rectangular or square, when the cover portion 30 contracts along the central axis X, the wire member 31 arranged along the central axis X comes into contact with a relatively large area. Therefore, in the cover portion 30 contracted along the central axis X, a transmission force of the force in the direction along the central axis X may be improved.

The length of the guide wire 10 can be appropriately set, and can be, for example, 300 mm to 5000 mm.

The coil portion 32 is formed by spirally winding the linear wire member 31. Alternatively, the coil portion 32 may be cut out from the circular tube by laser processing or the like.

The material for the coil portion 32 is preferably elastically deformable and hard to some extent. For example, the material for the coil portion 32 can be a shape memory alloy to which a shape memory effect or superelasticity is imparted by heat treatment, a metal such as stainless steel, tantalum, titanium, platinum, gold, or tungsten, a polyolefin such as polyethylene or polypropylene, a polyester such as polyamide or polyethylene terephthalate, a fluorine-based polymer such as PTFE (polytetrafluoroethylene) or ETFE (ethylene-tetrafluoroethylene copolymer), PEEK (polyether ether ketone), or polyimide. As the shape memory alloy, a Ni—Ti based alloy, a Cu—Al—Ni based alloy, a Cu—Zn—Al based alloy, or the like can be suitably used. The coil portion 32 may include an X-ray contrast material. The X-ray contrast material is preferably formed of, for example, at least one metal or two or more alloys selected from a group formed of gold, platinum, iridium, tungsten, gold alloys, platinum alloys, iridium alloys, tungsten alloys, and silver-palladium alloys. Since the coil portion 32 is formed in a spiral shape, unevenness is increased, and high ultrasound imaging properties can be obtained.

In general, the guide wire 10 has relatively high flexibility while having a certain degree of rigidity so as not to damage a biological lumen to be inserted and so as to be pushed forward in a curved biological lumen. Therefore, in the guide wire 10 according to the present embodiment, when the distal end portion of the cover portion 30 receives a force toward the proximal end side in a state in which deflection (deformation in the radial direction) is not restricted, any portion of the guide wire 10 is deflected, and the force escapes from the distal end portion of the cover portion 30 to another portion. Further, since the distal end portion of the guide wire 10 is bent, the force toward the proximal end side is less likely to act on the guide wire 10, and a force that contracts the cover portion 30 toward the central axis X is less likely to act on the guide wire 10. Therefore, even when the cover portion 30 receives the force toward the proximal end side at the distal end, a force necessary to contract the cover portion 30 toward the central axis X does not act on the cover portion 30. Therefore, the cover portion 30 is bent by receiving the force toward the proximal end side in a free deflection state, and maintains a state in which the needle portion 16 is accommodated.

As shown in FIGS. 1 and 6A, the inserter 60 used together with the guide wire 10 can receive the guide wire 10 and then the inserter 60 (with the guide wire 10) is inserted into the dilator 40. In order to appropriately puncture the foramen ovalis O, it is necessary to provide the device with an appropriate angle and rigidity so as to appropriately face the foramen ovalis O in the right atrium. The inserter 60 can be inserted into the dilator 40 to increase the rigidity and angle of the device and thereby ensure the device appropriately faces or is appropriately oriented relative to the foramen ovalis O in the right atrium.

The dilator 40 is used to widen the hole of the foramen ovalis O formed by the guide wire 10. The dilator 40 has a tapered outer portion 42 at a distal end portion of the dilator 40. The outer diameter of the tapered outer portion 42 is reduced toward the distal end side in a tapered shape. An inner cavity (lumen or through opening) of the dilator 40 opens at the end portion (distal end portion) of the tapered portion 42 where the outer diameter is the smallest. The inserter 60 is inserted into the dilator 40 from the opening on the proximal end side.

The dilator 40 is inserted into the outer sheath 50 from the opening on the proximal end side of the outer sheath 50. The outer sheath 50 can pass through the hole of the foramen ovalis O formed by the guide wire 10 together with the dilator 40. After the dilator 40 is removed, the inner cavity of the outer sheath 50 provides an access route of the ablation catheter.

Next, operation and effects of the guide wire 10 according to the present embodiment will be described.

As shown in FIG. 6A, the guide wire 10 is accommodated in an assembly including the outer sheath 50 and the dilator 40 in a state of being accommodated in the inserter 60. That is, the guide wire 10 is positioned in the inserter 60, the combination of the guide wire 10 and the inserter 60 is positioned in the dilator 40, and the combination of the guide wire 10, the inserter 60 and the dilator 40 is positioned in the outer sheath 50. At this time, the distal end of the guide wire 10 is disposed between an opening portion on the distal end side of the dilator 40 (open distal end of the dilator 40) and an opening portion on the distal end side of the inserter 60 (open distal end of the open distal end of the inserter 60). When the guide wire 10 moves in the inserter 60 and the dilator 40, the puncture portion 15 of the guide wire 10 is maintained in a state of being accommodated in the cover portion 30. Accordingly, when the guide wire 10 moves in the inserter 60 and the dilator 40, the puncture portion 15 is prevented from damaging the inserter 60 and the dilator 40, or the puncture portion 15 itself is prevented from being damaged.

The guide wire 10 is pushed in a state in which the distal end of the dilator 40 abuts against the foramen ovalis O. That is, when the distal end of the dilator 40 abuts against or is in contact with the foramen ovalis O, the guide wire 10 is pushed in or moved axially forward. As shown in FIG. 3A, the curve portion 35A of the cover portion 30 has a linear shape inside the inserter 60. Accordingly, the gap distance d between the wire members 31 located on the concave side of the curve portion 35A increases. Accordingly, the contraction portion 35 having the curve portion 35A is contractible along the central axis X. Even when the gap distance d of the curve portion 35A is zero in a state where the curve portion 35A is curved, the gap distance d of the curve portion 35A can be a length exceeding zero by the curve portion 35A being linear.

When the guide wire 10 moves to the distal end side inside the inserter 60 and the dilator 40 (i.e., when the guide wire 10 moves in the distal direction relative to the inserter 60 and the dilator 40), the cover portion 30 located on the distal end side of the guide wire 10 comes into contact with the foramen ovalis O. Accordingly, the force toward the proximal end side acts on the distal end of the cover portion 30 located at the most distal end of the guide wire 10. The linearly deformed contraction portion 35 changes from the state shown in FIG. 3A to the state shown in FIG. 3B by receiving the force toward the proximal end side. Accordingly, the contraction portion 35 of the cover portion 30 elastically contracts along the central axis X and so the space between adjacent windings of the cover portion 30 in the contraction portion 35 are reduced.

Figure 3B:
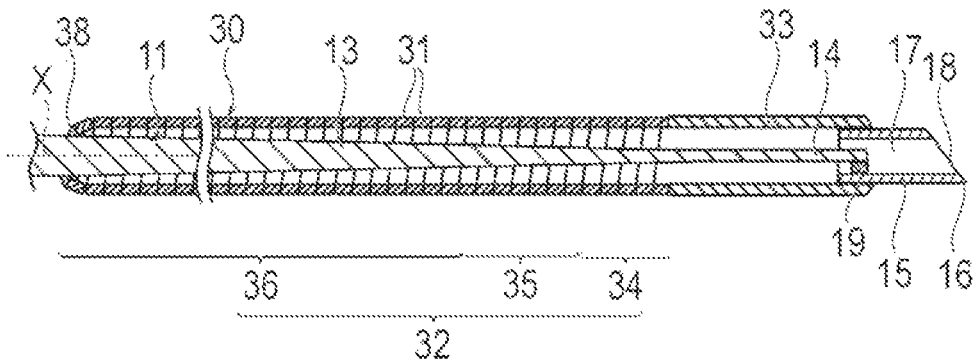

When the contraction portion 35 contracts along the central axis X by virtue of the guide wire 10 moving in the distal direction relative to the inserter 60 and the dilator 40, as shown in FIGS. 3B and 6A, the accommodation tube 33 located on the distal end side of the contraction portion 35 moves toward the proximal end side with respect to the puncture portion 15. Accordingly, the needle portion 16 of the puncture portion 15 accommodated inside the accommodation tube 33 is exposed from the accommodation tube 33 to the distal end side. That is, the needle portion 16 of the puncture portion 15 is positioned distally beyond the distal end of the accommodation tube 33. Therefore, the guide wire 10 can form a hole in the foramen ovalis O by the puncture portion 15 exposed from the cover portion 30. After the puncture portion 15 passes through the foramen ovalis O and reaches the left atrium, the cover portion 30 passes through the formed hole. When the distal end of the cover portion 30 passes through the hole, as shown in FIGS. 3A and 6B, the contraction portion 35 that is elastically contracted extends along the central axis X due to its own restoring force. Accordingly, the puncture portion 15 is once again accommodated in the accommodation tube 33 of the cover portion 30 and so the needle portion 16 of the puncture portion 15 is positioned proximal of the distal end of the accommodation tube 33. The wire curve portion 10A and the contraction portion 35 are automatically restored to the original bent shape. Since the cover portion 30 accommodating the puncture portion 15 protrudes from the dilator 40, the cover portion 30 is not restricted from being deflected by the dilator 40. Therefore, even when a force toward the proximal end side acts on the distal end of the cover portion 30 positioned at the most distal end of the guide wire 10, the cover portion 30 can be freely deflected, and the cover portion 30 is less likely to contract along the central axis X. Therefore, the puncture portion 15 in the left atrium does not protrude from the cover portion 30, and the state of being accommodated in the cover portion 30 is maintained. Therefore, the puncture portion 15 can be prevented from erroneously puncturing an unintended position. Since the wire curve portion 10A is bent, a force toward the proximal end side is less likely to act on the distal end surface of the cover portion 30 located at the most distal end of the guide wire 10. Therefore, the cover portion 30 is less likely to contract along the central axis X, and damage to the biological tissue can be prevented by the wire curve portion 10A.

Even if the force toward the proximal end side acts on the distal end of the cover portion 30, the gap distance d of the contraction portion 35 that returns to the bent shape is smaller than the gap distance d when the contraction portion 35 has a linear shape. Accordingly, the total gap length, which is the sum of the gap distances d located at the cover distal end portion 37, is shorter than the separation distance L between the distal end of the cover portion 30 and the distal end of the puncture portion 15. Therefore, even if the cover portion 30 contracts so that the gap distance d of the cover distal end portion 37 disappears, the distal end of the puncture portion 15 does not protrude from the cover portion 30. Therefore, damage to the biological tissue by the puncture portion 15 can be prevented. The guide wire 10 passing through the foramen ovalis O can guide movement of the dilator 40 and the outer sheath 50 from the right atrium to the left atrium.

As described above, the guide wire 10 according to the first embodiment is the guide wire 10 for guiding a tubular elongated body (for example, the dilator 40) to be inserted into a living body. The guide wire 10 includes: the elongated shaft portion 11 that has flexibility; the puncture portion 15 that is disposed at a distal end portion of the shaft portion 11 and forms a hole in a biological tissue; and the cover portion 30 that is formed of the wire member 31 wound in a spiral shape, has the contraction portion 35 that is contractible, and covers the puncture portion 15. The contraction portion 35 is capable of causing the puncture portion 15 to protrude from the cover portion 30 by contracting the contraction portion 35 in a linear state. When the contraction portion 35 is in a curved state, the contraction portion 35 is restricted in contraction so that the puncture portion 15 does not protrude from the cover portion 30 by contact of adjacent wire members 31 on the concave side.

In the guide wire 10 constituted as described above, when the contraction portion 35 is in the curve state, even if the force acts on the cover portion 30 from the distal end side and a contraction force acts on the cover portion 30, the wire members 31 on the concave side of the contraction portion 35 come into contact with each other, and the puncture portion 15 does not protrude from the cover portion 30. Therefore, the guide wire 10 according to this disclosure can help prevent erroneous puncture by the puncture portion 15, and can obtain relatively high safety. Since the puncture portion 15 is normally covered with the cover portion 30, the puncture portion 15 can be prevented from damaging other devices during operation or damage to the puncture portion.

When the contraction portion 35 is in the linear state, the gap distance d between the wire members 31 of the contraction portion 35 is longer than the gap distance d between the wire members 31 at a portion of the cover portion 30 different from the contraction portion 35. Accordingly, the contraction portion 35 can contract rather effectively when the puncture portion 15 protrudes from the cover portion 30.

The guide wire 10 has the distal end portion of the contraction portion 35 located on the distal end side with respect to the center position of the contraction portion 35 when the contraction portion 35 is in the curved state, a sum of gap distances between the wire members 31 located at the distal end portion of the contraction portion 35 is defined as the total gap length, and the total gap length is shorter than the separation distance L between the distal end of the cover portion 30 and the distal end of the puncture portion 15 on the concave side due to the contraction portion 35 being curved. Accordingly, even when the force acts on the cover portion 30 from the distal end side when the contraction portion 35 is in the curved state, and the wire members 31 on the concave side of the contraction portion 35 come into contact with each other, the puncture portion 15 does not protrude from the cover portion 30. Therefore, the guide wire 10 according to this disclosure can help prevent erroneous puncture by the puncture portion 15, and can obtain relatively high safety. The distal end portion of the contraction portion 35 is a portion from the center position (curve center position C) of the contraction portion 35 to a distal end side boundary portion 35D which is a boundary between the contraction portion 35 and the distal end dense pitch portion 34.

The cover portion 30 can include the accommodation tube 33 located on the distal end side of the contraction portion 35. The accommodation tube 33 is formed of the wire member 31 drawing a spiral line (i.e., the wire member 31 that defines spiral windings) without a gap or a tubular body. Accordingly, the accommodation tube 33 does not contract along the central axis X, and the contraction portion 35 also does not contract substantially, so that it is possible to prevent the puncture portion 15 from unintentionally protruding from the accommodation tube 33. Therefore, the guide wire 10 can help prevent erroneous puncture by the puncture portion 15, and can obtain relatively high safety.

The adjacent wire members 31 may be in contact with each other on the concave side due to the contraction portion 35 being in the curved state. Accordingly, the contraction portion 35 is less likely to contract. Therefore, the puncture portion 15 can be prevented from unintentionally protruding from the cover portion 30. Therefore, the guide wire 10 can help prevent erroneous puncture by the puncture portion 15, and can obtain relatively high safety.

When the contraction portion 35 is in the linear state, and the contraction portion 35 contracts most, the distal end of the cover portion 30 is located on the proximal end side with respect to the distal end of the puncture portion 15, and is located on the distal end side with respect to the proximal end of the puncture portion 15. Accordingly, the distal end of the puncture portion 15 protrudes from the cover portion 30 at the time of puncturing, and the puncture can be performed. Further, it is possible to prevent the proximal end of the puncture portion 15 from being exposed from the cover portion 30 and the cover portion 30 from being caught by the proximal end of the puncture portion 15. Therefore, puncture failure of the puncture portion 15 can be prevented, and accommodation failure of the puncture portion 15 by the cover portion 30 can be prevented.

In accordance with an aspect, the cover portion 30 has a relatively dense pitch portion (for example, the proximal end dense pitch portion 36) at which the wire members 31 come into contact with each other, on the proximal end side of a sparse pitch portion (for example, the contraction portion 35) at which there is a gap between the wire members 31. Accordingly, since the dense pitch portion does not contract along the central axis X, the contraction force can be concentrated on the sparse pitch portion. Since the sparse pitch portion is disposed only on the distal end side of the cover portion 30, the contraction force can be concentrated on the distal end portion of the cover portion 30.

Figure 4:
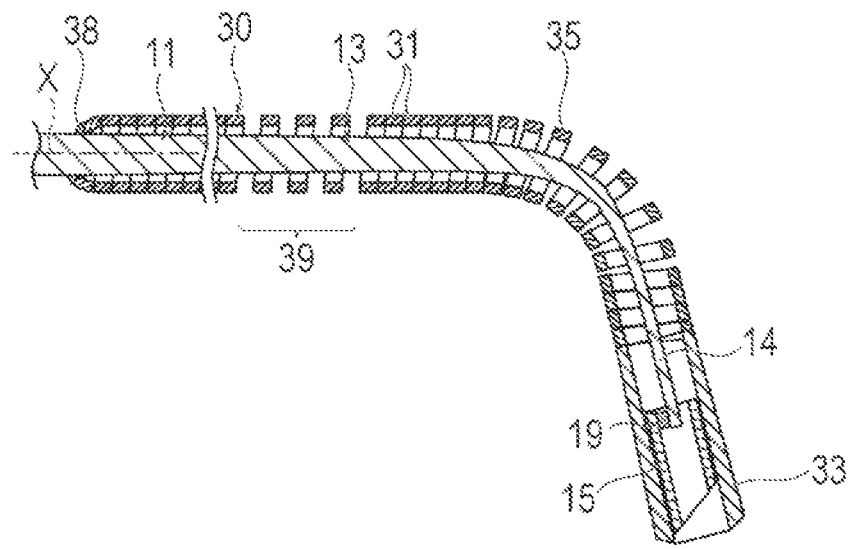
FIG. 4 is a cross-sectional view showing a modification of the guide wire according to the first embodiment.

As in a modification shown in FIG. 4, when the contraction portion 35 is in the curved state, the contraction portion 35 may have a proximal end sparse pitch portion 39 at which there is a gap between the wire members 31 on the proximal end side of a curved portion of the contraction portion 35 (for example, the curve portion 35A). Accordingly, the cover portion 30 can be sufficiently contracted in order to protrude the puncture portion 15. Since the cover portion 30 has the contractible proximal end sparse pitch portion 39, it is easy to set the gap between the spiral wire members 31 located on the distal end side of the cover portion 30 to be relatively small. Therefore, it is possible to prevent the puncture portion 15 located inside the distal end side of the cover portion 30 from unintentionally protruding from the cover portion 30.

As in the modification shown in FIG. 4, the outer diameter of the distal end portion (for example, the accommodation tube 33) of the cover portion 30 may decrease toward the proximal end side. Accordingly, after the portion having a large outer diameter (enlarged outer diameter portion) on the distal end side of the accommodation tube 33 passes through the biological tissue, the portion having a small outer diameter on the proximal end side of the cover portion 30 including the accommodation tube 33 can rather easily pass through the hole of the biological tissue.

Figure 5:
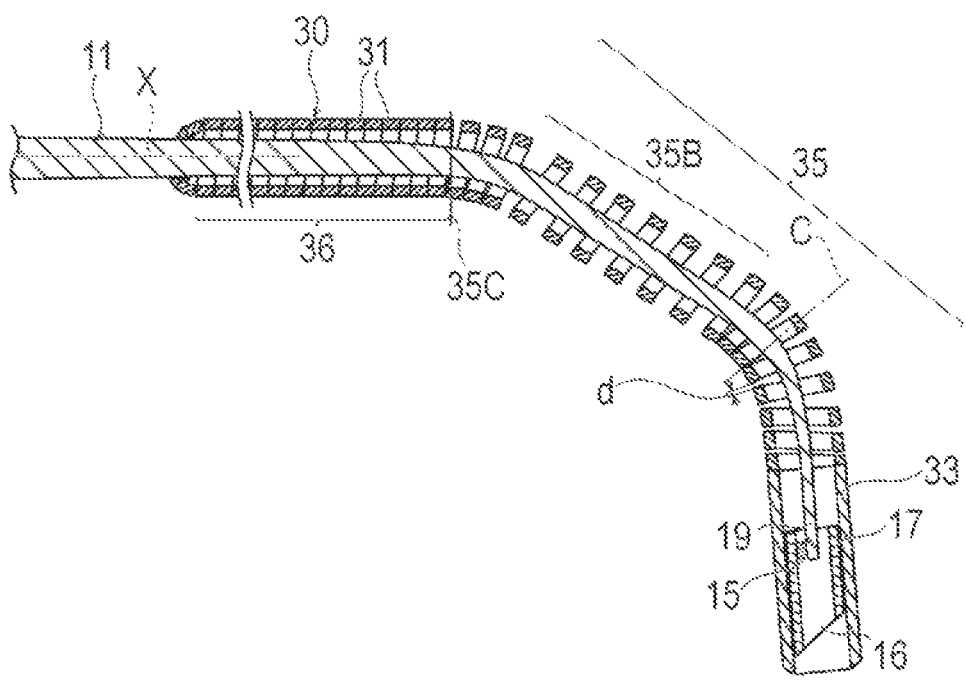
FIG. 5 is a cross-sectional view showing another modification of the guide wire according to the first embodiment.

As in another modification shown in FIG. 5, when the contraction portion 35 is in the curved state, the contraction portion 35 may have a proximal end portion of the contraction portion 35 located on the proximal end side with respect to the center position of the contraction portion 35 (curve center position C), and the contraction portion 35 may include a linear sparse pitch portion 35B at which there is a gap between the wire members 31 at the proximal end portion of the contraction portion 35. Accordingly, since the cover portion 30 can be contracted by the linear sparse pitch portion 35B, the cover portion 30 can be sufficiently contracted in order to protrude the puncture portion 15. Since the cover portion 30 includes the linear sparse pitch portion 35B on the proximal end side of the curve center position C, the gap distance d between the spiral wire members 31 located on the distal end side of the curve center position C can be easily set to be small. Therefore, it is possible to prevent the puncture portion 15 located inside the distal end side of the cover portion 30 from unintentionally protruding from the cover portion 30. The proximal end portion of the contraction portion 35 is a portion from the center position of the contraction portion 35 (curve center position C) to a proximal end side boundary portion 35C which is a boundary between the contraction portion 35 and the proximal end dense pitch portion 36.

Second Embodiment

Figure 7A:
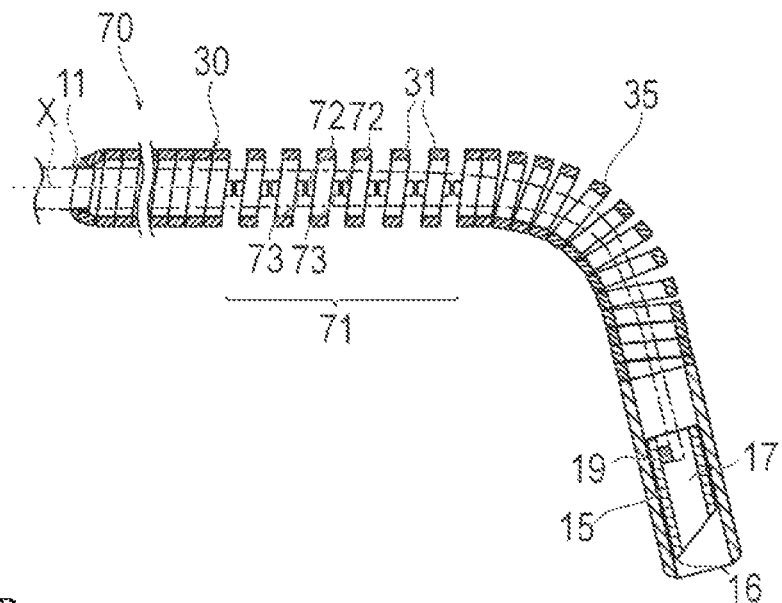
FIGS. 7A and 7B are cross-sectional views showing a distal end portion of a guide wire according to a second embodiment.

As shown in FIG. 7A, a guide wire 70 according to a second embodiment is different from the first embodiment in that a first projection portion 72 and a second projection portion 73 are provided at a sparse pitch portion 71 of the cover portion 30.

The cover portion 30 includes the sparse pitch portion 71 at which there is a gap between the wire members 31. A position where the sparse pitch portion 71 is formed is not particularly limited. For example, the sparse pitch portion 71 is located closer to the proximal end side than the contraction portion 35, and may be located in the contraction portion 35 or may be located closer to the distal end side than the contraction portion 35. The wire member 31 located in the sparse pitch portion 71 is formed with the first projection portion 72 protruding toward the wire member 31 located on the proximal end side. The first projection portion 72 has a top surface that is a plane substantially perpendicular to the central axis X. The wire member 31 located in the sparse pitch portion 71 is formed with the second projection portion 73 protruding toward the wire member 31 located on the distal end side. The second projection portion 73 has a top surface that is a plane substantially perpendicular to the central axis X. In the natural state, the second projection portion 73 faces the first projection portion 72 along the central axis X so as to be able to contact the first projection portion 72. In the natural state, the second projection portion 73 is close to or in contact with the first projection portion 72. The first projection portion 72 and the second projection portion 73 are arranged on the wire member 31 of the cover portion 30 so as to be parallel to the central axis X. One or more rows of the first projection portion 72 and the second projection portion 73 arranged parallel to the central axis X are provided in a circumferential direction, and preferably two or more rows of the first projection portion 72 and the second projection portion 73 are provided. The first projection portion 72 and the second projection portion 73 may not be arranged parallel to the central axis X. The cover portion 30 preferably has a bent curve portion, but may not have a curve portion.

When a force toward the proximal end side acts on the distal end of the cover portion 30 of the guide wire 70, the second projection portion 73 abuts against the first projection portion 72. At this time, since the top surface of the first projection portion 72 and the top surface of the second projection portion 73 are flat surfaces, the first projection portion and the second projection portion come into contact with each other in a wide range. Therefore, the first projection portion 72 and the second projection portion 73 are in good contact with each other and are not easily displaced from each other. Since the top surface of the first projection portion 72 and the top surface of the second projection portion 73 are perpendicular to the central axis X, the first projection portion 72 and the second projection portion 73 are in good contact with each other and are not easily displaced. Accordingly, in the sparse pitch portion 71, the gap between the adjacent wire members 31 is maintained. Therefore, the cover portion 30 is less likely to contract along the central axis X. Therefore, the distal end of the puncture portion 15 does not protrude from the cover portion 30. Therefore, damage to the biological tissue by the puncture portion 15 can be prevented.

Figure 7B:
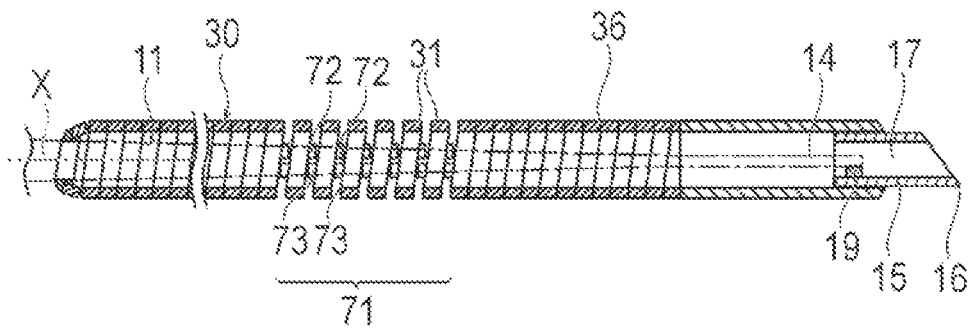

When the guide wire 70 is inserted into the inserter 60 and the dilator 40 (see FIG. 6), bending of the guide wire 70 can be restricted. Next, the distal end of the cover portion 30 located at the distal end portion of the guide wire 70 is abutted against the biological tissue to restrict rotation of the distal end of the cover portion 30. In this state, the shaft portion 11 located at the proximal end portion of the guide wire 70 is twisted. Accordingly, the spiral of the wire member 31 of the cover portion 30 is twisted, and the first projection portion 72 and the second projection portion 73 move to positions where the first projection portion 72 and the second projection portion 73 do not abut against each other. Accordingly, the sparse pitch portion 71 is contractible along the central axis X and contracts. Accordingly, as shown in FIG. 7B, the distal end of the puncture portion 15 protrudes from the cover portion 30, and the biological tissue can be punctured.

Figure 8:
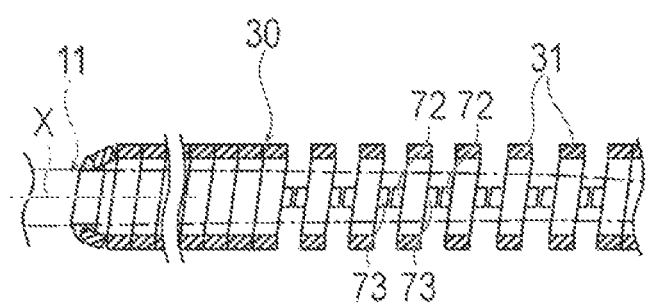
FIG. 8 is a cross-sectional view showing a modification of the guide wire according to the second embodiment.

The top surface of the first projection portion 72 and the top surface of the second projection portion 73 may not be perpendicular to the central axis X. For example, as in a modification shown in FIG. 8, the top surface of the first projection portion 72 and the top surface of the second projection portion 73 are substantially parallel to each other and are inclined with respect to a plane perpendicular to the central axis X. Accordingly, when the first projection portion 72 and the second projection portion 73 abut against each other and a compressive force equal to or greater than a predetermined value acts, the first projection portion 72 and the second projection portion 73 slide with respect to each other. Accordingly, the first projection portion 72 and the second projection portion 73 do not abut against each other. As a result, the sparse pitch portion 71 is contractible along the central axis X and contracts. Therefore, even if the proximal end portion of the guide wire 70 is not twisted, the first projection portion 72 and the second projection portion 73 can be moved to positions where the first projection portion 72 and the second projection portion 73 do not abut against each other only by pushing the guide wire 70.

As described above, the guide wire 70 according to the second embodiment is the guide wire 70 for guiding a tubular elongated body (for example, the dilator 40) to be inserted into a living body. The guide wire 70 includes: the elongated shaft portion 11 that has flexibility; the puncture portion 15 that is disposed at the distal end portion of the shaft portion 11 and forms a hole in the biological tissue; and the cover portion 30 that is formed of the wire member 31 wound in a spiral shape, has the contraction portion 35 that is contractible, and covers the puncture portion 15. The cover portion 30 includes at least one first projection portion 72 in a part of the contraction portion 35 in a circumferential direction. The contraction portion 35 includes the second projection portion 73 in a part of the contraction portion 35 in the circumferential direction, the second projection portion 73 facing the first projection portion 72 along the central axis X of the cover portion 30 so as to be capable of coming into contact with the first projection portion 72 in the natural state.

In the guide wire 70 constituted as described above, even when a force is applied to the cover portion 30 from the distal end side in the natural state, the first projection portion 72 and the second projection portion 73 come into contact with each other, and contraction of the cover portion 30 is prevented. Therefore, the puncture portion 15 does not protrude from the cover portion 30. Therefore, the guide wire 70 according to this disclosure can prevent erroneous puncture by the puncture portion 15, and can obtain relatively high safety. When the guide wire 70 moves in the inserter 60 and the dilator 40, the puncture portion 15 is prevented from damaging the inserter 60 and the dilator 40, or the puncture portion 15 itself is prevented from being damaged.

Third Embodiment

Figure 9:
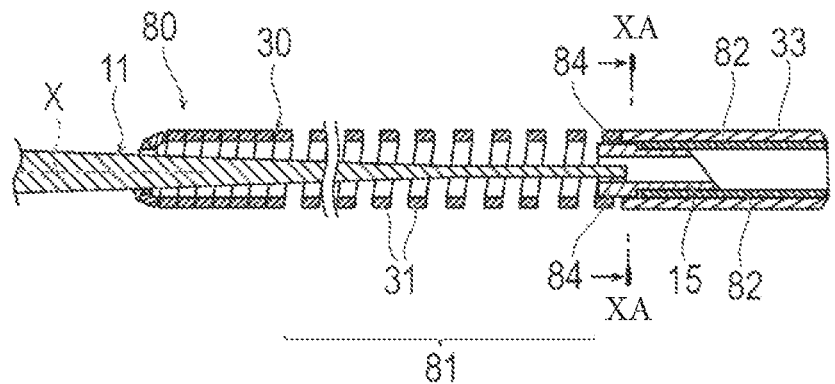
FIG. 9 is a cross-sectional view showing a distal end portion of a guide wire according to a third embodiment.
Figure 10A:
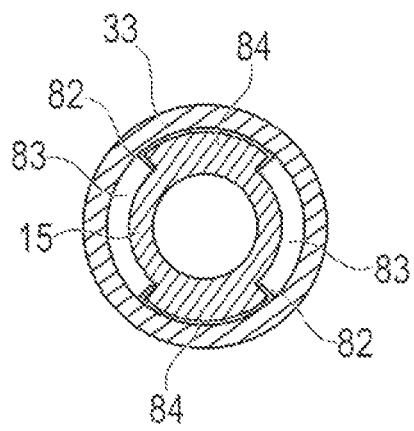
FIGS. 10A and 10B are diagrams showing the guide wire according to the third embodiment.

As shown in FIGS. 9 and 10A, a guide wire 80 according to a third embodiment is different from the first embodiment in that a first projection portion 82 is provided in the accommodation tube 33 and a second projection portion 84 is provided in the puncture portion 15.

The cover portion 30 includes a sparse pitch portion 81 at which there is a gap between the wire members 31. A position where the sparse pitch portion 81 is formed is not particularly limited. The cover portion 30 preferably has a bent curve portion, but may not have a curve portion.

Two first projection portions 82 protruding radially inward are formed on an inner peripheral surface of the accommodation tube 33. The two first projection portions 82 are formed at positions facing each other in the circumferential direction. A passage 83 is formed on the inner peripheral surface of the accommodation tube 33 so as to be sandwiched between the two first projection portions 82.

The puncture portion 15 has two second projection portions 84 formed on an outer peripheral surface of the puncture portion 15 so as to protrude radially outward. The two second projection portions 84 are formed at positions facing each other in the circumferential direction. In the natural state, the second projection portion 84 faces the first projection portion 82 along the central axis X so as to be able to contact the first projection portion 82. An outer diameter of a portion of the puncture portion 15 where the second projection portion 84 is formed is larger than an inner diameter of a portion of the accommodation tube 33 where the first projection portion 82 is formed and is smaller than an inner diameter of a portion of the accommodation tube 33 where the passage 83 is formed. Therefore, the second projection portion 84 can pass through the inside of the passage 83 of the accommodation tube 33 along the central axis X. However, the second projection portion 84 cannot pass along the central axis X inside the portion of the accommodation tube 33 where the first projection portion 82 is formed.

When a force toward the proximal end side acts on the distal end of the cover portion 30 of the guide wire 80, the second projection portion 84 abuts against the first projection portion 82. Accordingly, the guide wire 80 cannot move toward the proximal end side with respect to the puncture portion 15. Therefore, the distal end of the puncture portion 15 does not protrude from the cover portion 30. Therefore, damage to the biological tissue by the puncture portion 15 can be prevented.

Figure 10B:
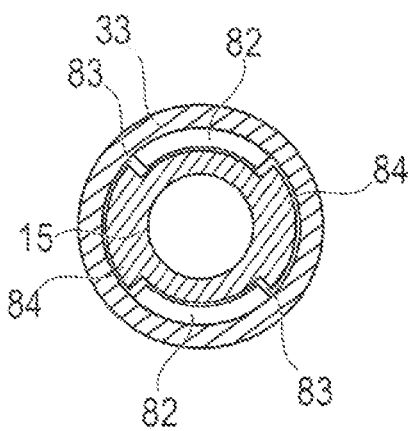

When the guide wire 80 is inserted into the inserter 60 and the dilator 40 (see FIG. 6), bending of the guide wire 80 is restricted. Next, the distal end of the cover portion 30 located at the distal end portion of the guide wire 80 is abutted against the biological tissue to restrict rotation of the distal end of the cover portion 30. In this state, the shaft portion 11 located at the proximal end portion of the guide wire 70 is twisted by about 90 degrees. Accordingly, the puncture portion 15 located at the distal end portion of the shaft portion 11 rotates with respect to the accommodation tube 33. Therefore, as shown in FIG. 10B, the second projection portion 84 of the puncture portion 15 moves to a position where the second projection portion 84 does not abut against the first projection portion 82. Accordingly, the second projection portion 84 of the puncture portion 15 can pass through the passage 83 of the accommodation tube 33. Therefore, the sparse pitch portion 81 is contractible along the central axis X and contracts. As a result, the distal end of the puncture portion 15 protrudes from the cover portion 30, and the biological tissue can be punctured.

As described above, the guide wire 80 according to the third embodiment is the guide wire 80 for guiding a tubular elongated body (for example, the dilator 40) to be inserted into a living body. The guide wire 80 includes: the elongated shaft portion 11 that has flexibility; the puncture portion 15 that is disposed at the distal end portion of the shaft portion 11 and forms a hole in the biological tissue; and the cover portion 30 that is formed of the wire member 31 wound in a spiral shape, has the contraction portion 35 that is contractible, and covers the puncture portion 15. The cover portion 30 includes at least one first projection portion 82 in a part of a portion different from the contraction portion 35 in the circumferential direction. The puncture portion 15 includes the second projection portion 84 in a portion in the circumferential direction, the second projection portion 84 facing the first projection portion 82 along the central axis X of the cover portion 30 so as to be capable of coming into with the first projection portion 82 in the natural state.

In the guide wire 80 constituted as described above, even when a force is applied to the cover portion 30 from the distal end side in the natural state, the first projection portion 82 and the second projection portion 84 come into contact with each other, and contraction of the cover portion 30 is prevented. Therefore, the puncture portion 15 does not protrude from the cover portion 30. Therefore, the guide wire 80 according to this disclosure can help prevent erroneous puncture by the puncture portion 15, and can obtain relatively high safety. When the guide wire 80 moves in the inserter 60 and the dilator 40, the puncture portion 15 is prevented from damaging the inserter 60 and the dilator 40, or the puncture portion 15 itself is prevented from being damaged.

This disclosure is not limited to the embodiment described above, and various modifications can be made by those skilled in the art within a scope of the technical idea of this disclosure. For example, the dilator 40 and the inserter 60 are separate bodies, and may be integrated. If the dilator 40 is provided, the inserter 60 may not be provided.

The detailed description above describes embodiments of a guide wire for puncturing a biological tissue representing examples of the inventive guide wire disclosed here. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A guide wire for guiding a tubular elongated body to be inserted into a living body, the guide wire comprising:
    a flexible elongated shaft portion, the shaft portion includes a diameter decreasing portion between a proximal end portion of the shaft portion and a distal end portion of the shaft portion;
    a puncture portion configured to form a hole in a biological tissue, the puncture portion being at the distal end portion of the shaft portion;
    a cover portion that is formed of a wire member wound in a spiral shape, the cover portion being fixed to the shaft portion and includes a contraction portion that is contractible and covers the puncture portion;
    the contraction portion being configured such that the puncture portion protrudes from the cover portion by contraction of the contraction portion in a linear state;
    when the contraction portion is in a curved state, the contraction portion is restricted in contraction so that the puncture portion does not protrude from the cover portion by contact of adjacent wire members on a concave side of the contraction portion; and
    wherein the shaft portion includes a curved portion, and when the contraction portion is in the curved state, the contraction portion axially overlaps the curved portion of the shaft portion.

2. The guide wire according to claim 1, wherein, when the contraction portion is in the linear state, a gap distance between the wire members of the contraction portion is longer than a gap distance between the wire members at a portion of the cover portion different from the contraction portion.

3. The guide wire according to claim 1,
    wherein, when the contraction portion is in the curved state, the contraction portion has a distal end portion of the contraction portion located on a distal end side with respect to a center position of the contraction portion;
    a sum of gap distances between the wire members located at the distal end portion of the contraction portion is defined as a total gap length; and
    the total gap length is shorter than a separation distance between a distal end of the cover portion and a distal end of the puncture portion on the concave side of the contraction portion due to the contraction portion being curved.

4. The guide wire according to claim 1, wherein the cover portion includes an accommodation tube located on a distal end side of the contraction portion, and the accommodation tube is formed of the wire member drawing a spiral line without a gap or a tubular body.

5. The guide wire according to claim 1, wherein the adjacent wire members come into contact with each other on a concave side due to the contraction portion being in the curved state.

6. The guide wire according to claim 1, wherein when the contraction portion is in the linear state, and the contraction portion contracts most, a distal end of the cover portion is located on a proximal end side with respect to a distal end of the puncture portion, and is located on the distal end side with respect to a proximal end of the puncture portion.

7. The guide wire according to claim 1, wherein, when the contraction portion is in the curved state, the contraction portion includes a proximal end sparse pitch portion at which there is a gap between the wire members on a proximal end side with respect to a curved portion of the contraction portion.

8. The guide wire according to claim 1, wherein, when the contraction portion is in the curved state, the contraction portion includes a proximal end portion of the contraction portion located on a proximal end side with respect to a center position of the contraction portion; and
    the contraction portion has a linear sparse pitch portion at which there is a gap between the wire members on the proximal end portion of the contraction portion.

9. The guide wire according to claim 1, wherein an outer diameter of the cover portion decreases toward a proximal end side of the cover portion.

10. The guide wire according to claim 1, wherein the cover portion includes a dense pitch portion at which the wire members are in contact with each other on a proximal end side of a sparse pitch portion at which there is a gap between the wire members.

11. The guide wire according to claim 1, wherein an axial center of the puncture portion and an axial center of the shaft distal end portion coincide with each other.

12. The guide wire according to claim 1, wherein the cover portion is fixed on the decreasing diameter portion of the shaft portion.

13. The guide wire according to claim 1, wherein the tubular member has a through-hole penetrating in an axial direction; and
the distal end portion of the shaft portion has a constant outer diameter portion extending from the decreasing diameter portion of the shaft portion toward a distal end of the shaft portion.

14. The guide wire according to claim 13, wherein the distal end of the shaft distal end portion of the shaft portion is fixed to an inner peripheral surface of the puncture portion by a needle fixing portion.

15. The guide wire according to claim 1, wherein the shaft portion is an elongated wire member.

16. The guide wire according to claim 1, wherein the puncture portion has an inclined surface inclined with respect to a central axis at the distal end of the puncture portion.

17. A guide wire in combination with a sheath assembly, the guide wire being configured to guide a part of the sheath assembly that is configured to be inserted into a living body comprising:
the guide wire comprising:
a flexible elongated shaft portion, the shaft portion includes a diameter decreasing portion between a proximal end portion of the shaft portion and a distal end portion of the shaft portion;
a puncture portion configured to form a hole in a biological tissue, the puncture portion being at the distal end portion of the shaft portion;
a cover portion that is formed of a wire member wound in a spiral shape, the cover portion being fixed to the shaft portion and includes a contraction portion that is contractible and covers the puncture portion;
the contraction portion being configured such that the puncture portion protrudes from the cover portion by contraction of the contraction portion in a linear state;
when the contraction portion is in a curved state, the contraction portion is restricted in contraction so that the puncture portion does not protrude from the cover portion by contact of adjacent wire members on a concave side of the contraction portion;
wherein, when the contraction portion is in the linear state, a gap distance between the wire members of the contraction portion is longer than a gap distance between the wire members at a portion of the cover portion different from the contraction portion;
wherein the shaft portion includes a curved portion, and when the contraction portion is in the curved state, the contraction portion axially overlaps the curved portion of the shaft portion; and
the sheath assembly comprising a dilator, the dilator including a distal end and a tapered outer surface that tapers toward the distal end of the dilator so that an outer diameter of the dilator becomes smaller toward the distal end of the dilator, the dilator including a lumen that communicates with an open end at the distal end of the dilator, the guide wire being positionable in the lumen in the dilator.

18. The guide wire in combination with the sheath assembly according to claim 17, wherein
when the contraction portion is in the curved state, the contraction portion has a distal end portion of the contraction portion located on a distal end side with respect to a center position of the contraction portion;
a sum of gap distances between the wire members located at the distal end portion of the contraction portion is defined as a total gap length; and
the total gap length is shorter than a separation distance between a distal end of the cover portion and a distal end of the puncture portion on the concave side of the contraction portion due to the contraction portion being curved.

19. The guide wire in combination with the sheath assembly according to claim 17, wherein the cover portion includes an accommodation tube located on a distal end side of the contraction portion, and the accommodation tube is formed of the wire member drawing a spiral line without a gap or a tubular body.

20. The guide wire in combination with the sheath assembly according to claim 17, wherein the wire members come into contact with each other on a concave side due to the contraction portion being in the curved state.

* * * * *